UNITED STATES PATENT OFFICE.

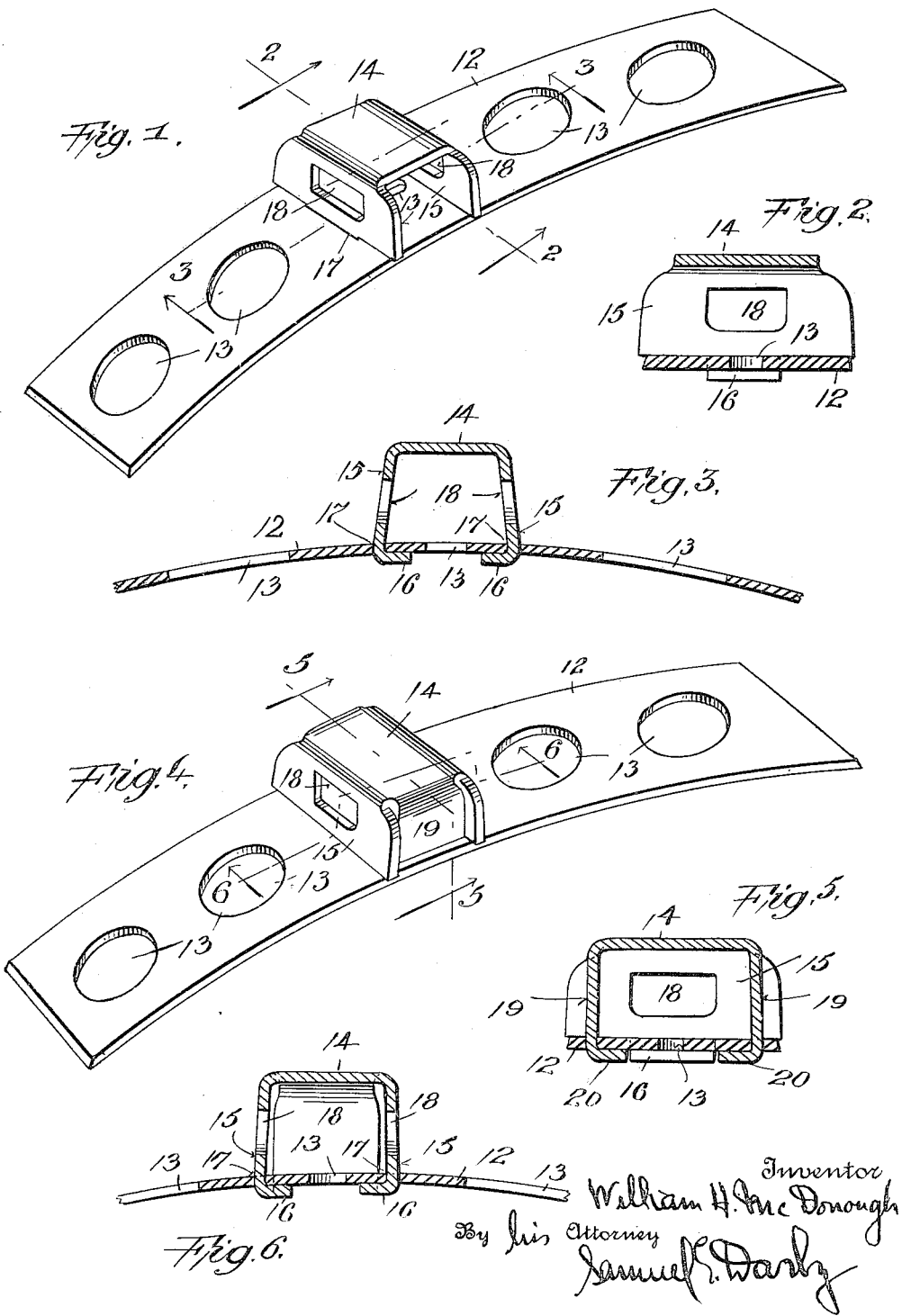

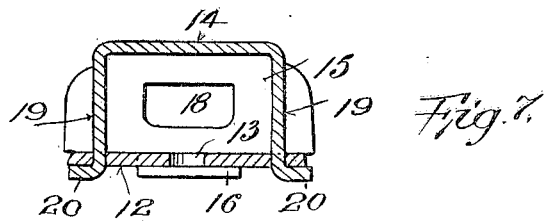
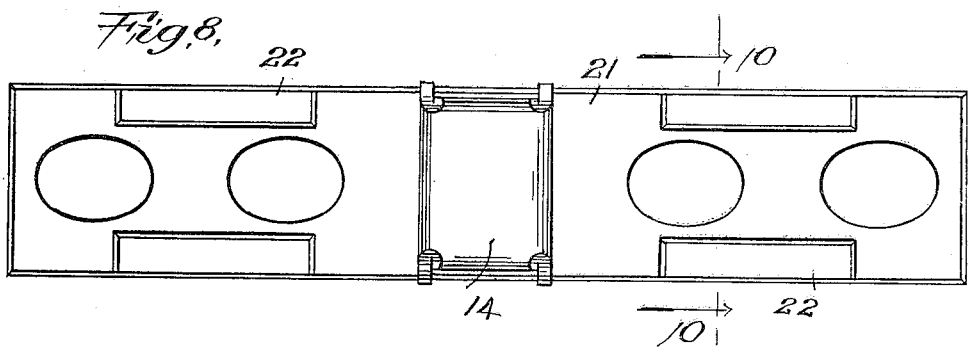
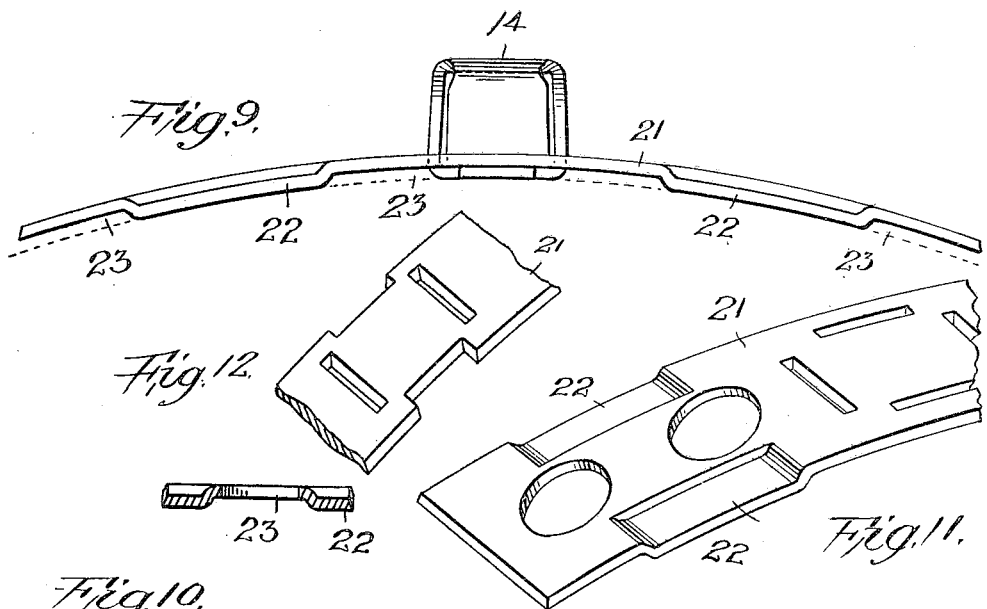

WILLIAM H. McDONOUGH, OF NEW YORK, N. Y., ASSIGNOR, BY MESNE ASSIGNMENTS, TO THE AMERICAN BRAKE SHOE AND FOUNDRY COMPANY, OF WILMINGTON, DELAWARE, A CORPORATION OF DELAWARE.

REINFORCING BACK-PLATE AND KEY-LUG ATTACHMENT FOR BRAKE-SHOES.

1,224,476.   Specification of Letters Patent.   Patented May 1, 1917.

Application filed April 25, 1916. Serial No. 93,361.

*To all whom it may concern:*

Be it known that I, WILLIAM H. MCDONOUGH, a citizen of the United States, residing at New York, in the county and State of New York, have made a certain new and useful Invention in Reinforcing Back-Plate and Key-Lug Attachments for Brake-Shoes, of which the following is a specification.

The invention relates to reinforcing back plate and key lug attachments for brake shoes.

The object of the invention is to provide a reinforcing back plate and key lug attachment for brake shoes which is strong, and durable, and economical to manufacture.

Other objects of the invention will appear more fully hereinafter.

The invention consists substantially in the construction, combination, location and relative arrangement of parts, all as will be more fully hereinafter set forth, as shown in the accompanying drawings, and finally pointed out in the appended claims.

Referring to the accompanying drawings:—

Figure 1 is a view in perspective of a reinforcing back plate and key lug attachment for brake shoes according to one form of embodiment of my invention.

Fig. 2 is a transverse section of the same on the line 2, 2, Fig. 1, looking in the direction of the arrows.

Fig. 3 is a longitudinal section on the line 3, 3, Fig. 1, looking in the direction of the arrows.

Fig. 4 is a view similar to Fig. 1, showing another form of embodiment of my invention.

Figs. 5 and 6 are respectively transverse and longitudinal sectional views on the lines 5, 5, and 6, 6, respectively, looking in the direction of the arrows.

Fig. 7 is a view similar to Fig. 5, showing a slightly different arrangement of key lug edges or clencher tongues.

Figs. 8 and 9 are respectively, a top plan and a side elevation showing a slightly modified form of backing plate.

Fig. 10 is a transverse section on the line 10, 10, Fig. 8, looking in the direction of the arrows.

Fig. 11 is a broken view in perspective of the form of backing plate shown in Figs. 8 and 9.

Fig. 12 is a similar view of a modified structure.

The same part is designated by the same reference numeral wherever it occurs throughout the several views.

It is common practice in the manufacture of brake shoes to apply a reinforcing back plate of sheet steel or other ductile metal to the backs of brake shoes, the two being secured together in a convenient manner, the reinforcing back plate being provided or formed with a key lug to afford means for attaching the shoe to the brake head. Experience has shown that the weakest part of the structure is the key lug and its attachment to the backing plate. Since the greatest strains, in the use of the shoes, are imposed upon the key lug and the points of attachment thereof to the shoe body, economy demands that the key lug should have maximum strength in its structure, and also, if made separate from the plate, that it should be attached to the plate in such manner as to afford the maximum strength of attachment, while at the same time the plate itself should retain uniform strength throughout. This latter result is impossible of attainment where the key lug is struck up out of the metal of the backing plate, to produce a lug integral with the plate, nor where the lug is formed of tongues or lips cut in the body of the backing plate and bent up.

Moreover, in use, it frequently occurs that the body of the shoe wears down from frictional contact with the tread of the car wheel to which it is applied until finally the steel surface of the reinforcing back plate comes in contact with the steel surface of the wheel tread and takes the bearing contact thereagainst. Since it is the friction of the cast metal of the shoe body itself when applied to the steel tread of the wheel which secures the breaking action in the application of the shoe, this friction and the resulting braking action is so far reduced and destroyed when the steel backing plate takes the bearing contact against the steel wheel tread as to render the device useless as a brake appliance.

It is among the special purposes of my present invention to provide a brake shoe structure in which the key lug is made separate from the reinforcing backing plate and is secured to the plate in such manner as to afford maximum strength and to avoid any weakening of the plate at the points of attachment of the key lug thereto. It is also among the special purposes of my invention to provide means whereby when the shoe body is worn down to the point where the steel backing plate contacts with the wheel tread there is still retained areas of cast metal of the shoe body which also contact with the wheel tread and which affords a measure of frictional braking action impossible to obtain when the steel alone of the plate contacts with the steel of the wheel tread.

In the drawings I have shown various embodiments of my invention.

Referring particularly to Figs. 1, 2, and 3, 12 is the reinforcing backing plate to be applied to the shoe body in any well known manner, as, for instance, by casting the shoe body thereto in a mold, the plate, if desired, being provided with holes or openings 13, therethrough to permit the metal of the shoe body, when poured in the mold, to flush therethrough to afford a means for attaching the plate and the shoe body together. This is a common expedient in the manufacture of brake shoes. My invention, of course, is not to be limited or restricted to this method of applying the reinforcing plate to the shoe body. The key lug is shown at 14, and in this embodiment of my invention is of inverted open-ended channel shape with the side walls 15, thereof disposed transversely across the back plate, and provided with centrally arranged tongues or feet 16, which are projected through transverse slots 17 in the plate and are clenched on the under side of the plate. The side walls 15 of the lug have alined key way openings 18 formed therethrough. By reason of this feature the key which secures the shoe to the brake head takes bearing against the walls of the openings 18 and these are formed wholly in the key lug side walls. This structure affords a very strong key lug and back plate attachment, with maximum strength of lug and without reducing the strength of the plate or interrupting its continuity from end to end. The tongues or feet 16 may be clenched against the underside of the plate in either direction, that is away from or toward each other. In the particular form shown they are clenched toward each other.

In Figs. 4, 5, 6, and 7, I have shown the lug with end wall portions 19, as well as side walls 15, these end wall portions having tongues 20 which project through longitudinally extending slots in the plate 12, and are clenched inwardly toward each other, as shown in Fig. 5, or outwardly away from each other, as shown in Fig. 7, against the under side of the plate.

In Figs. 8, 9, 10, and 11 I have shown the reinforcing back plate 21, provided with pressed out portions 22, at various positions in its length. By depressing these portions out of the general plane of the inner side surface of the plate seats or areas, indicated at 23, are formed in its surface which receive and retain the cast metal of the shoe body so that when the shoe body in use, wears down till the pressed out portions 22 contact with the wheel tread there still remains cast iron areas 23 to afford a friction bearing on the wheel treads.

It is sometimes the case that narrow backing plates are required. To meet this contingency I provide the longitudinal slots in the backing plate flush with the edge thereof, as shown in Fig. 12. Thus it will be seen that when the tongues of the lug are placed in the slot, the ends of the lug will be flush with the side edges of the backing plate.

Having now set forth the objects and nature of my invention and various constructions embodying the principles thereof, what I claim as new and useful, and of my own invention, and desire to secure by Letters Patent, is,—

1. In a brake shoe attachment, a reinforcing backing having independent transverse slots therethrough, said slots lying within the side edges of said backing and extending substantially across the width thereof, in combination with a key lug having side walls transversely disposed across said back and tongues formed on said side walls and extending through said independent slots and clenched against the inner side of said back.

2. In a brake shoe attachment, a reinforcing backing having independent transverse slots therethrough, said slots lying within the side edges of said backing and extending substantially across the width thereof, in combination with a key lug having side walls transversely disposed across said back and tongues formed on said side walls and extending through said slots and clenched against the inner side of said back, said side walls also having alined key way openings formed through the metal thereof.

3. The combination with a reinforcing back having slots therethrough, of a key lug having side and end walls, and disposed transversely across said back, said walls having tongues extending through the slots in said back and clenched against the inner surface of the back.

4. The combination with a reinforcing back having slots therethrough, of a key lug having side and end walls, and disposed transversely across said back, said walls having tongues extending through the slots in said back and clenched against the inner surface of the back, said side walls having alined key way openings formed therethrough.

5. In a brake shoe attachment, a reinforcing back and a key lug formed separately, said key lug being of inverted channel shape and disposed transversely across the back, said back being provided with a pair of parallel slots lying within the side edges and extending substantially across the width thereof, and the side walls of said lug being provided with tongues or feet extending through said slots and clenched toward each other against the inner face of said backing.

6. In a brake shoe attachment a reinforcing back and a key lug formed separately, said key lug being disposed transversely across said back and provided with side and end tongues extending through slots in the back, and clenched toward each other against the inner surface of said back.

In testimony whereof I have hereunto set my hand on this 20th day of April, A. D. 1916.

WILLIAM H. McDONOUGH.

Copies of this patent may be obtained for five cents each, by addressing the "Commissioner of Patents, Washington, D. C."